(12) United States Patent
Yuki

(10) Patent No.: US 7,187,281 B2  
(45) Date of Patent: Mar. 6, 2007

(54) MICROWAVE TRANSMISSION/RECEPTION ELEMENT STRUCTURE WITH DISTANCE-TO-SUBJECT RELATIVE MOTION, AND RELATED METHODOLOGY

(75) Inventor: Tex Yuki, Juliaetta, ID (US)

(73) Assignee: EMIT Technologies, L.L.C., Seattle, WA (US)

( * ) Notice: Subject to any disclaimer, the term of this patent is extended or adjusted under 35 U.S.C. 154(b) by 219 days.

(21) Appl. No.: 11/069,841

(22) Filed: Feb. 26, 2005

(65) Prior Publication Data

US 2006/0202823 A1    Sep. 14, 2006

(51) Int. Cl.
G08B 13/18 (2006.01)
G01J 5/02 (2006.01)

(52) U.S. Cl. .............. 340/552; 340/573.1; 250/341.8; 250/358.1

(58) Field of Classification Search .......... 340/552, 340/553, 554, 567, 573.1; 324/663, 76.56; 250/341.8, 358.1, 393
See application file for complete search history.

(56) References Cited

U.S. PATENT DOCUMENTS

| | | |
|---|---|---|
| 4,234,844 A | 11/1980 | Yukl |
| 4,318,108 A | 3/1982 | Yukl |
| 4,532,939 A | 8/1985 | Yukl |
| 4,878,059 A | 10/1989 | Yukl |
| 4,912,982 A | 4/1990 | Yukl |
| 4,947,848 A | 8/1990 | Yukl |
| 4,949,094 A | 8/1990 | Yukl |
| 4,975,968 A | 12/1990 | Yukl |
| 5,083,089 A | 1/1992 | Yukl |
| 6,057,761 A | 5/2000 | Yukl |
| 6,242,740 B1 * | 6/2001 | Luukanen et al. .......... 250/353 |
| 6,359,582 B1 * | 3/2002 | MacAleese et al. .......... 342/22 |
| 6,501,414 B2 * | 12/2002 | Arndt et al. .................. 342/22 |
| 6,791,487 B1 * | 9/2004 | Singh et al. .................. 342/22 |
| 6,856,271 B1 * | 2/2005 | Hausner ...................... 342/22 |
| 6,965,340 B1 * | 11/2005 | Baharav et al. .............. 342/22 |

OTHER PUBLICATIONS

U.S. Appl. No. 10/304,388, filed Nov. 25, 2002, Yukl.

* cited by examiner

*Primary Examiner*—Toan N. Pham
(74) *Attorney, Agent, or Firm*—Jon M. Dickinson, PC; Robert D. Varitz, PC

(57) ABSTRACT

Apparatus and a method for scanning personnel for the purpose of detecting and identifying certain categories of materials/objects. The invention utilizes stacked-circuit-board tiled assemblies, including one circuit board which carries an array of transmission/reception scanning microwave elements, which elements, during a scanning operation are shifted toward and away successively from a person being scanned. This motion is carried out in a manner enabling detection of peak valley (high and low) values of standing wave reflections, if any, which exist between one of these elements and a region of a person being scanned by the invention. These peak and valley values can be employed, with respect to the magnitude difference between them, to enable "found material/objects" identification.

16 Claims, 4 Drawing Sheets

MICROWAVE TRANSMISSION/RECEPTION ELEMENT STRUCTURE WITH DISTANCE-TO-SUBJECT RELATIVE MOTION, AND RELATED METHODOLOGY

REFERENCES TO, AND INCORPORATION BY REFERENCE OF, PRIOR PATENTS AND PATENT APPLICATIONS

In the present specification, references are variously made to interesting background information relevant to the present invention, and contained in different ones of the following, listed (a) U.S. Patents, and (b) pair of currently pending U.S. Regular Patent Applications U.S. Pat. No. 4,234,844 for "Electromagnetic Noncontacting Measuring Apparatus";
U.S. Pat. No. 4,318,108 for "Bidirectionally Focusing Antenna";
U.S. Pat. No. 4,532,939 for "Noncontacting, Hyperthermia Method and Apparatus for Destroying Living Tissue in Vivo";
U.S. Pat. No. 4,878,059 for "Farfield/Nearfield Transmission/Reception Antenna";
U.S. Pat. No. 4,912,982 for "Non-Perturbing Cavity Method and Apparatus for Measuring Certain Parameters of Fluid Within a Conduit";
U.S. Pat. No. 4,947,848 for "Dielectric-Constant Change Monitoring";
U.S. Pat. No. 4,949,094 for "Nearfield/Farfield Antenna with Parasitic Array";
U.S. Pat. No. 4,975,968 for "Timed Dielectrometry Surveillance Method and Apparatus";
U.S. Pat. No. 5,083,089 for "Fluid Mixture Ratio Monitoring Method and Apparatus";
U.S. Pat. No. 6,057,761 for "Security System and Method";
Patent application Ser. No. 10/304,388, filed Nov. 25, 2002 by Tex Yukl for "Dielectric Personnel Scanning"; and
Patent application Ser. No. 10/963,183, filed Oct. 12, 2004 by Tex Yukl for "Integrated Microwave Transceiver Tile Structure"

All of the above documents contain useful information, and accordingly the entireties of the disclosure contents of these several patents, and of the two U.S. Patent Applications, are hereby incorporated herein by reference.

BACKGROUND AND SUMMARY OF THE INVENTION

The use of microwave dielectrometers in the mid-range area between the microwave nearfield and farfield has many attractive attributes in relation to scanning human subjects for the presence of contraband, explosives, weapons, and other forms of non-physiologic objects and materials. These virtues are adequately described in various ones of the above-referenced documents.

In a setting such as those described in the above-referenced '388 and '183 patent applications, wherein each one of plural transmission/reception (TR) elements is employed, with each element effectively being responsible for scanning and interrogating a particular, differentiated volume of space in front of it, and recognizing that effectively there is always a "load" in front of each such element, there are circumstances wherein unwanted noise signals significantly degrade the signal-to-noise ratio characteristic of received signals, and do so in a manner which makes assessment of important scanning information difficult segregate and assess. Where any effort is sought to utilize received-signal information in a manner intended to aid in characterizing a "found non-physiologic anomaly", a noise-induced degradation in signal-to-noise ratio, as just mentioned, can make such a characterization extremely difficult.

I have discovered, however, that there is a very special resolution to this issue, and in particular, a resolution which both solves effectively the signal-to-noise ratio problem, and at the same time does so in a context which preserves all of the key operating and utility advantages of the basic scanning structure and methodology described in the two just-mentioned above-referenced patent applications. My resolution to this issue is grounded in the recognition that collectively, each single TR element, in association with any downstream irradiated load, and the intervening media, form a transmission line in space. As a load is moved toward such a TR element, detected incident reflection-pulse amplitude is seen to increase and decrease in quarter-wavelength spatial intervals, finally disappearing in the farfield where the "load" is not close enough to the TR element to "create" such detectable amplitude variations. This increase and decrease phenomenon is caused by the load-reflected wave alternately being in-phase and out-of-phase with the incident wave with motion in the time or range domains.

The explanation for these changes in a radiating system is well documented in transmission-line theory, and is based upon the output impedances of the transmitting source, of the intervening media, and of the terminating, irradiated load. When all of these are equal, there are no standing waves, and the range or distance from transmitting element (TR element) to load has no appreciable affect on the amplitude of a detected signal. In this situation, a system is said to be terminated in its characteristic impedance.

Changes in terminating load impedance, however, unbalance a system and in fact create standing waves that are detectable. Quantities known in the art as Reflection Coefficient and Standing Wave Ratio are the resulting measurements of this mismatch, or imbalance.

The peak-to-peak (high-to-low) standing-wave values are fairly constant over a wavelength range of about two to about ten wavelengths measured from the transmitting element. If the transmitting element can be moved one-half wavelength relative to a subject being irradiated and scanned, one can, within the mentioned two to ten wavelength range, definitely detect and capture one maximum and one minimum standing-wave peak, regardless of the subject's distance from the transmitting element. Significantly, while these maximum and minimum values will change in the presence of noise, the difference between them will not appreciably change. If a detection system produces a value equal to the peak-to-peak value difference between the maximum and minimum standing-wave peaks, the changes associated with true pulse peak amplitude values are common-moded, thus increasing signal-to-noise ratio.

As will be seen, the apparatus and methodology of the present invention utilizes this detectable maximum-to-minimum standing-wave peak value phenomenon.

In general terms, the present invention relates to microwave dielectometry apparatus, and in particular to such apparatus which includes one (or plural) transmission/reception (TR) element(s), each having a TR axis (the element's operational axis), which element(s) is(are) employable in and with respect to a methodology involving dielectric microwave scanning of a human subject. Further, the invention pertains to such apparatus, and to associated scanning methodology, wherein scanning is done both for the purpose of detecting, in relation to baseline physiologic response data, and according to defined screening criteria, notable differences, or anomalies, in relation to a given individual's "dielectric signature", and additionally for providing some discernible information regarding the natures of certain forbidden, illegal, dangerous, contraband, etc., non-physiologic objects or material(s) carried on and by a person.

The present invention represents an augmented version of the invention described in the above-identified '183, currently pending patent application—augmented by the introduction and use of an important discovery that by producing relative motion of a TR element along its axis toward/away from an individual being screened, or scanned, and during such scanning (as will be described below), valuable information can be gathered to indicate not only the presences, but also the natures, of certain "forbidden" objects and other non-physiologic materials.

While there are many substance-scanning (or screening) applications in which the TR-element structure, system and methodology of this invention find substantial practical utility, two specific such applications are particularly noted herein, and one of these is employed as a principal model for discussing and explaining the structure and operation (methodology) of this invention. These two applications include (a) security detection, or scanning (screening), at locations such as airports for the purpose of detecting weapons, contraband, etc., and (b) authorized access control for personnel in sensitive areas, for example, in relation to research and development areas within a business. Many other useful applications will come to mind to those generally skilled in the art.

A preferred embodiment of, and manner of practicing, the present invention are described herein in relation to a scanning system and its apparatus which departs from, and offers certain improvements over, a like, predecessor system and methodology that are fully illustrated and described in above-mentioned U.S. Pat. No. 6,057,761. These improvements, which exist in certain areas that involve both mechanical and electrical aspects of the previously illustrated scanning process and structure per se, result in the present invention having certain preferential utility in particular applications, such as in applications involving airport-security screening areas, where a very efficient, high throughput of people needs to be accommodated without compromising scanning resolution and effectiveness. In terms of how scanned data is ultimately read (monitored and evaluated based upon the operation of the TR structure of this invention) to detect dielectric anomalies (non-physiologic) that are important to detect, and except as the present invention proposes a unique form of useful relative motion along the operational axis of a TR element between that element and a person being scanned, substantially the same technology which is described in the just-mentioned '761 patent is also employed, for the most part, in the improved apparatus, system and methodology version which are disclosed in this document.

By way of further background, and regarding the dielectric scanning (or screening) process which is implemented by the TR-element structure of the present invention, as a general statement respecting the relevant physics, all materials have what is known as a dielectric constant. This constant is associated with their physical and electrical (electromagnetic and electrostatic) properties. As a consequence, when exposed to different wavelengths and frequencies of microwave radiation, each material produces a reflection reaction, or response, to that radiation, which response, in nature, is uniquely related, among other things, to the particular material's respective dielectric constant. By subjecting a material to controlled, transmitted, microwave energy, it is possible to interpret a material's reflection "response" thereto in terms of its dielectric constant. The term "dielectric signature" is employed herein to refer to this phenomenon.

Where plural, different characters of materials are closely united in a selected volume of space, microwave radiation employed to observe and detect the "dielectric signature" of that "space" will elicit a response which is based upon an averaging phenomenon in relation to the respective dielectric-constant contributions which are made in that space by the respective, different, individual material components. This averaging condition plays an important role in the effectiveness of use of the present invention, and this role is one which the reader will find fully described and discussed in the above-mentioned '761 patent.

In a system and methodology of the type just above generally outlined and suggested, the TR-element structure (or TR structure) of this invention is designed to direct microwave radiation into the human anatomy (at completely innocuous levels regarding any damage threat to tissue, body fluids, or bone) in such a fashion that it will effectively engage a volumetric space within the body wherein there are at least two, different (boundaried) anatomical (known physiologic) materials, each characterized by a different dielectric constant, which materials co-contribute, in the above-mentioned "averaging" manner, to the "effective", apparent "uniform" (or nominal homogeneous) dielectric constant of the whole space. As is explained by way of background in the '761 patent, by so designing the TR structure of the present invention and its operation to engage the mentioned at-least-two-material volumetric space inside the anatomy, the likelihood that a weapon, or an article of contraband, will, by the nature of its own dielectric constant, and/or its specific configuration and shape, and/or its precise location and/or disposition relative to the human body, "fool" the invention by masquerading as a normal and expectable anatomical normal physiologic constituent, is just about nil. Preferably the "penetration depth" of this internal anatomical space is about 2½ wavelengths of the system operating frequency as measured mechanically in material having the mentioned "normal" dielectric constant.

If and when a foreign, non-physiologic object, such as a weapon, or a contraband object, is borne by a person, for example closely against the outside the body, the presence of this object will, therefore, and does, change the average dielectric constant of the material content of the volume of space (anatomy, of course, included) which is occupied, and will do so in a very non-normal-anatomical, and very detectable, manner, by the mentioned microwave radiation. Definitively, the presence of such non-expected (non-anatomical physiologic) material significantly changes the average value of the effective, average and apparent, uniform, spatial dielectric constant, in accordance with the averaging phenomena just mentioned above, and creates a situation wherein a distinctly different-than-expected dielectric signature appears as a responsive result of microwave scanning transmission in accordance with practice of the invention. This scanning or screening process may be thought of herein as being a practice of substance-scanning differentiation between physiology and non-physiology.

Further describing important distinctions that exist between prior art conventional practice, and practice performed in accordance with the TR structure of the present invention, whereas conventional scanning systems are designed only to look for and "identify" a rather large number of specific objects and materials (substances), the approach taken according to the present invention is twofold in nature. First, it is based upon examining human physiology for physiologic irregularities/abnormalities which are not expected to be part of the usual human, physiologic, dielectric signature (within a range of course) that essentially all people's bodies are expected to produce. As a consequence of this quite different "first" approach for scanning, the system and methodology practiced by the TR structure of this invention are significantly more efficient, and quicker, in terms of identifying the presences of weaponry, contraband, etc. problem situations. Any out-of-norm physiologic signature which is detected produces an alarm state, which state can be employed to signal the need for security people to take a closer look at what the particular, just-scanned subject involved might have on his or her person.

Secondly, the invention takes advantage of the discovery, mentioned earlier herein, that shifting of the location of a TR element during a scanning phase, along its operational axis, and unidirectionally either toward or away from a person being scanned, can be utilized to detect the peak and valley amplitude values of the microwave-reception standing wave which exists between a functioning TR element and that person. Specifically these values can be discerned if the TR element is so shifted by a distance which is at least equal to, and preferably slightly greater than, one-half the operational wavelength of the TR element. Significantly, looking at these specific peak and valley values implements a common-mode signal-acquisition practice which greatly minimizes the effects which noise can have on proper and useful signal detection. It thus greatly enhances signal-to-noise ratio.

In this systemic and operational setting, the present invention specifically relates both to a unique utilization of a TR element as an individual per se, and to the utilization of plural-TR-element, integrated, modular tile structure (tile) which includes plural, compactly stacked, piggybacked circuit boards (panels), or layer structure, in one of which are homogeneously molded, in a row and column matrix fashion, an array of common-material, microwave TR-element body structures. For the purpose of principal illustration and discussion of the invention herein, the invention is chiefly described in the context of such a tile structure. In such a tile structure, appropriate operational circuitry (referred to as first circuitry) generally described herein, and implementable in numbers of different ways which are well within the skill of those generally skilled in the relevant art, electrically interconnects the circuit boards, and functions to control and "drive" the operations of the TR elements during what are known as scanning phases in simultaneous transmission and reception modes of operation. More specifically, the TR elements in such a tile structure are densely organized to contribute significantly to overall file-structure compactness. The TR elements in a tile are arranged in a defined row-and-column pattern, and when two tiles are brought into appropriate side-by-side adjacency, this pattern forms an appropriate operational pattern continuum across the two tiles. A useful arrangement of the tiles indeed involves organizing plural tiles themselves into a row-and-column array, and such an array has been determined to be quite effective in a structure desired to "scan", for example, airline boarding passengers.

According to an illustrative manner of utilizing the invention, for example in the setting of an airport, a kiosk-like unit is provided into which a party to be scanned steps through an open, subject entry-way which is defined by a pair of spaced opposing upright panels, each of which carries an array of integrated, self-contained tile structures, or tiles, each including combined, coaxial, microwave TR elements. These two panels effectively define an always open and exposed through-passage through the region called a scanning zone between them, which region is referred to herein as a defined personnel scanning zone. These panels also define what can be thought of herein as being a panel-orientation-determined path for the passage of a person through the scanning zone. A complete scan of a human subject takes place in two stages, or scanning phases, with, in one phase, these panels being located on one set of opposite sides of the body, such as on the left and right sides of a person, and in the other phase, the panels being disposed in a quadrature-related condition (having been rotated, or revolved, ninety-degrees) to perform a second scan which is taken along the two orthogonally related body sides, such as the front and rear sides of the person. Between these two scan orientations, the panels are revolved (as was just noted) through a ninety-degree arc, and in each of the two scanning positions, there is essentially, and importantly, no relative lateral motion which takes place between the panels and the subject standing between them, and thus between the panels and the scanning zone. Thus, during the scan of each single person, the axes of the TR elements transition back and forth between two orthogonally related orientations relative to the scanning zone.

A special processing feature of the illustrated system employing the present invention, with respect to the handling and scanning of large numbers of people, such as must be handled at airport security locations, is that the illustrated system allows for the creation, essentially, of two, generally orthogonally related lines of people waiting to be scanned, with successive people who are scanned entering the scanning zone, one after another, and alternately, from the heads of each of the two orthogonally related lines. A person to be scanned initially faces the scanning zone with a clear (see-through) view into (and through) that zone between the two panels.

With the person in place in the scanning zone, and disposed relatively stationary within that zone, the first scanning phase takes place to examine, sequentially, the laterally opposite sides of that person. This scanning phase is implemented by a special pattern of high-speed energizations (by the first circuitry mentioned above) of tile-borne TR elements organized into arrays as mentioned above.

As will be seen, during each scanning phase, and with respect to each tile, the TR elements therein are shifted as a unit unidirectionally either toward or away from the system scanning zone by a distance which is no less than, and preferably slightly more than, one-half the selected operating wavelength (herein about 2-inches) of the TR elements. How this relative motion is employed to yield useful scanning information will be discussed below.

When such a first scanning phase is completed, structure supporting the two tile-carrying panels rotates, or revolves, these panels through an arc of ninety-degrees, and stops them in the second scanning position relative to the subject, wherein the front and rear sides of the person are similarly scanned, in a second scanning phase, sequentially under a circumstance similar to that just described where the panels, and the subject between them, are again relatively fixed in lateral positions with respect to one another, but wherein relative motion is produced to change the distance between the TR elements in each tile and the scanning zone. In this second scanning phase, the direction of relative motion for the TR elements in each tile is opposite that in which they were moved in the first scanning phase.

The second scanning operation completes the scan process for the single subject now being discussed, whereupon that subject turns a corner to the right or to the left (this is illustrated in the drawings) depending upon which is considered to be the exit side from the scanning zone, and exits through the now-rotated, open (see-through) space between the two panels. The panels with the tiles of this invention are now positioned orthogonally with respect to the positions that they held when the first person just described was to be scanned, and the lead person in the orthogonally related other line of people now enters the scanning zone from the orthogonal location of that other line. Scanning of this next person takes place in much the same fashion just above described, except for the fact that, when the panel structure rotates through an arc of about ninety-degrees to perform the second scan of this "next" person, it effectively counter-rotates back to the position which it initially held in preparation for the previously explained scanning of the first person mentioned above. Scanning data is appropriately computer acquired from all scanning phases (two per person).

From the scanning data which is gathered with respect to each scanned person, that data, by the operation of what is referred to herein as second circuitry, is compared to a "map" or "schedule" of appropriate, physiologic and other, dielectric data relating to someone with a body type, height and weight similar to that of the person specifically being scanned. Any notable, dielectric-signature-related abnormalities will cause an alarm state to be created (as will be later described), which state causes security people, for example, to call the particular subject aside for further and more focused scanning or other inspection. No photographic imagery is developed from any scanning data. Rather, one of the output qualities of scanned data includes the presentation, on a simple wire-form human anatomy shape, of one or more highlighted general anatomic areas that show where a detected abnormality resides. The relative-motion-associated data acquired may be used now, via the operation of the above-mentioned second circuitry, to characterize the natures of found anomalies. This presentation of data is easily readable and assessable with little personnel-interpretive activity required. Output data may also be presented in a somewhat grid-like, or checkerboard-like, field of light and dark patches whose lightnesses and darknesses are interpretable to indicate the presence of a detected dielectric, non-physiologic abnormality. Portions of this scanning process are more fully described in the '761 patent, and in the mentioned, prior-filed patent applications.

Other features and advantages that are offered by the present invention will become more fully apparent as the description which now follows is read in conjunction with the accompanying drawings.

DESCRIPTION OF THE DRAWINGS

Short, double-headed arrows present in FIGS. 7 and 8 illustrate the mentioned TR-element relative motion.

DETAILED DESCRIPTION OF THE INVENTION

Figure 1:
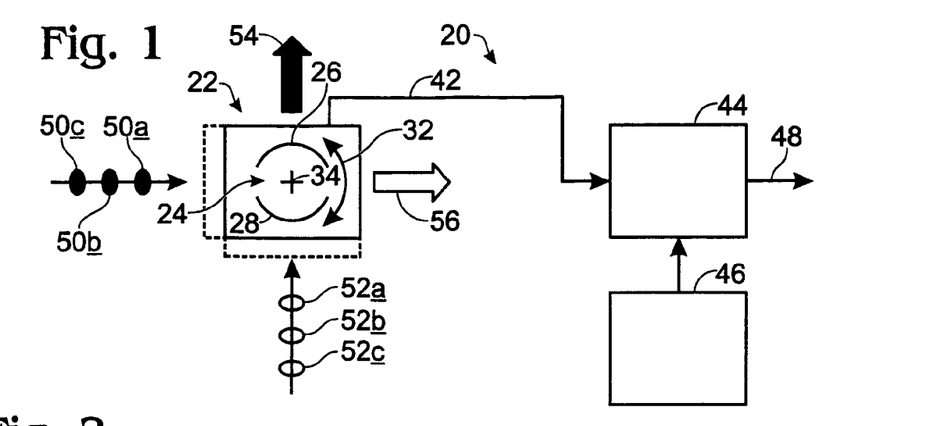
FIG. 1 is a simplified block/schematic diagram of a physiologic, dielectric scanning system which utilizes an organization of plural, integrated, microwave TR-element tile structures, or tiles, each including plural, stacked circuit boards, and associated with one of these boards TR elements constructed in accordance with the present invention.
Figure 2:
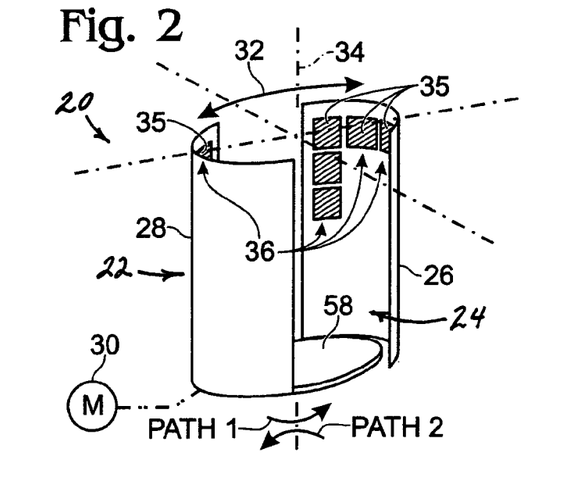
FIG. 2 is a simplified and stylized isometric view of a pair of ninety-degree counter-rotative (or counter-revolvable), microwave, TR-element, tile-unit panels which define opposite sides of a kiosk-like personnel scanning zone, which is useful to perform dielectric personnel scanning employing the structure of the present invention.

Turning attention now to the drawings, and referring first of all to FIGS. 1 and 2, indicated generally at 20 is a dielectric, physiologic, personnel scanning/screening system (or apparatus) built to include an arrangement of integrated transceiver tile structures including transmission/reception (TR) elements, also called scanning elements, made in accordance with a preferred embodiment of the present invention. As will be explained, apparatus 20 is designed for detecting and assisting in identifying certain categories of non-physiologic materials that may be being carried by a person.

Included in system 20 is a special kiosk-like unit 22 which includes what is referred to herein as a defined personnel scanning zone, or chamber, 24 that is specifically defined as a space between a pair of upright, curvilinear panels 26, 28. These panels are appropriately mounted for orthogonal (ninety-degrees only), reversible counter-rotation (or counter-revolution) under the influence of a drive motor 30, back and forth (as indicated by double-ended, curved arrow 32) about an upright axis 34 which extends upwardly centrally through the scanning zone. Axis 34 extends substantially normal to the plane of FIG. 1.

As will be more fully described shortly, each of panels 26, 28 carries, in three vertical columns extending generally from top to bottom along the panel, plural arrays of combined, microwave TR elements (later to be described) which form portions of integrated, plural, stacked circuit board tile structures 35. The preferred configuration for each such tile structure as illustrated herein takes the form generally of a rectangular (square) cube, though non-square and even non-rectangular shapes are certainly possible, if desired. Portions of four of such vertical columns of "tiles" are shown at 36 in FIG. 2. Several tiles 35 within these arrays are indicated.

Appropriate microwave functional operational circuitry which is associated with the behaviors of TR elements in tiles 35, which circuitry includes what is referred to herein as TR-element-function operational circuitry, as first circuitry, and as second circuitry, will also be described later. As will be explained, preferably, the defined operating frequency of the system, with respect to microwave activity, is 5.5-Gigahertz-an operating frequency which has been found to work especially well with respect to scanning for normal physiologic dielectric signatures of the human body. The wavelength in air for this frequency (defined wavelength λ) is about 2-inches. As will be seen, the sizings of components within tiles 35 "flow" from the selection of this operating frequency. Considerations regarding this "sizing" of components are fully described in various ones of the above-referred-to prior background patent and patent-application documents. Especially to be noted is the fact that the operating wavelength in air of the selected 5.5-Gigahertz frequency is about 2-inches. The importance of this "notation", which relates to considerations involving relative axial motion of the TR elements, will become apparent shortly.

Scanning output data is furnished, as is indicated by line 42 in FIG. 1, to a suitably programmed digital computer, or second circuitry, 44 which operates in association with an appropriate library of selectable, normal, human-subject, baseline, physiologic dielectric signatures, represented by a block 46 to furnish an alarm output signal on a line 48 when any defined signature abnormality is detected. Library 46 contains appropriate schedules, maps, etc. containing pre-established information regarding the selected range of human-body builds, physiologies, etc., that one wishes to profile for scanning purposes. Such information is freely designable by the user of the system and methodology of this invention. Its specific design is not a part of the present invention.

Also contained in library 46, as will shortly be more fully explained, is data which relates peak-to-valley, microwave-reflection, standing-wave amplified value differences to specific different categories and characteristics of certain "forbidden" non-physiologic substances and objects detected during a scanning operation.

Still considering what is shown particularly in FIG. 1, and generally describing the overall operation of system 20 from a "people-flow" point of view, three large black dots 50a, 50b, 50c, represent three people in a line of people waiting to enter chamber 24 from the left side of kiosk 22 in FIG. 1. Similarly, three large clear dots 52a, 52b, 52c, represent three of the people in another line of people awaiting scanning and screening within chamber 24, with this other line being disposed substantially in an orthogonal relationship with respect to the first-mentioned line of people. Two large arrows, including a darkened arrow 54 and a clear arrow 56, represent exit paths from chamber 24 for the people, respectively, who enter chamber 24 from the lines containing representative people 50a, 50b, 50c, and 52a, 52b, 52c, respectively. In other words, each person who enters from the line at the left of FIG. 1, in a direction which is generally from the left to the right in FIG. 1, will, after full, two-phase scanning has taken place, exit chamber 24 in the direction of arrow 54. Similarly, each person who enters chamber 24 from the line pictured on the bottom side of kiosk 22 in FIG. 1 will, after completion of a scanning operation, exit the scanning zone as indicated by arrow 56. Thus, each person who enters and exits zone 24 for scanning follows generally an orthogonal path through kiosk 22. At no time during any part of a scanning procedure is a person fully enclosed in chamber 24. Two diametrically opposite sides of the chamber, between the adjacent, upright edges of panels 26, 28, are always open. The two different orthogonal paths followed by alternate people being scanned are shown by labeled (PATH 1 and PATH 2) arrows in FIG. 2.

With panels 26, 28 positioned as specifically shown in FIGS. 1 and 2, these panels are arranged to allow the scanning zone to receive the first person who is standing in the line represented by blackened dots 50a, 50b, 50c. Such a person enters zone 24, through one of the two, open subject entrances to the zone, whereupon a first scanning phase is implemented under circumstances with that person, and panels 26, 28, relatively fixed in positional relationships with respect to one another. On completion of the first scanning phase for that person, then, under the control of motor 30, panels 26, 28 are rotated (revolved), for example, ninety-degrees counterclockwise so that they become positioned orthogonally relative to the positions shown for them in FIGS. 1 and 2. Following this repositioning of the panels, a second scanning phase is performed which, in the organization now being described, is a phase that scans the front and rear sides of the person who has entered zone 24 from the left in FIG. 1. Again, during the specific scanning, or screening, operation (simultaneous microwave transmission and reception), the relative positions of the person in zone 24 and panels 26, 28 is substantially fixed. In other words, scanning, takes place under circumstances, importantly, where the TR-element tiles carried by the panels are not moving laterally in relation to the person being scanned. The TR elements in each tile are, however, shifted linearly along their operational axes toward and away from a person in zone 24 during the two phases of scanning, as will shortly be described.

With completion of the two-phase scanning operation just generally described, panels 26, 28 are now disposed in such a fashion that they expose zone 24 for straight-ahead entry into the zone by the first person in the line of people represented below kiosk 22 in FIG. 1 by the large clear dots. Scanning is performed for this person in much the same fashion just described, after which, that person exits the scanning zone as indicated by arrow 56.

In addition to the scanning operation performed by the TR-element tiles carried by panels 26, 28, three other data-gathering operations take place with regard to everyone who is scanned in chamber 24. An appropriate weight scale, or sensor, is provided in a standing platform 58 (see FIG. 2) which forms the base of chamber 24. Further, additional dielectric scanning devices (not specifically shown) are provided underneath platform 58 for the purpose of "looking" upwardly into chamber 24 to gather scanning information regarding the foot and shoe regions in chamber 24. Additionally, the height of each person scanned in the chamber is determined, as was outlined earlier, at the conclusion of the first scanning phase associated with that person.

Figure 3:
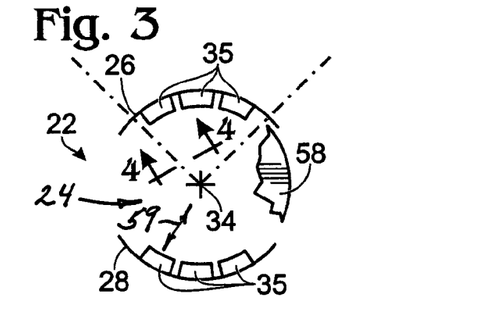
FIG. 3 is a simplified and stylized plan view looking downwardly into the scanning zone pictured in FIG. 2. Relative motion between TR elements and the mentioned scanning zone is generally pictured in this figure by a short, oppositely pointing, double-headed arrow.

Considering now all of the drawing figures, each columnar array 36 of tiles 35 is formed of eight vertically stacked tiles, and thus system 20 includes forty-eight tiles. The vertical columns of tiles in each panel are slightly angled relative to one another, as can best be seen in FIG. 3. The collective lateral width of the three deployed columns of tiles in each panel is about 30-inches.

Each integrated tile, or tile structure, 35 is formed in what is referred to herein as an assembled stack of plural, generally planar circuit boards, or circuit-board layer structures. Specifically, this stack includes three circuit boards 35a, 35b, 35c which are spaced from one another along what is referred to herein as a tile axis, shown at 35A (see FIGS. 4, 6, 7, 10 and 11). Board 35a is effectively in front of board 35b, which is effectively in front of board 35c. Board layer 35a forms part of what is referred to herein as a first, generally planar circuit-board structure. The nominal plane of board 35a is shown at 37 in FIGS. 9 and 11. Boards 35b, 35c collectively form parts of what is referred to herein as a second, generally planar circuit-board layer structure. Each of these boards has lateral dimensions defined by perimetral edges each of which has a length of about 10-inches. These lateral dimensions are illustrated in FIG. 5 at a and b. The three circuit boards in each tile are suitably arranged in the united stack with a stack depth which is shown at c in FIG. 5 of about 2-inches or less. As will be further discussed shortly, board 35a is appropriately supported in each tile 35 for selective, reversible motion along that tile's tile axis 35A relative to boards 35b, 35c.

Within each tile, circuit board 35a includes and specifically carries a defined row-and-column array of microwave TR (transmission/reception) elements, such as those generally pointed to in the figures at 60. Elements 60 include transmission/reception, or TR, operational axes 60a which substantially parallel tile axis 35A, and which additionally are substantially normal to previously mentioned circuit board portion plane 37. Axes 60a are aimed into scanning zone 24. Circuit boards 35b and 35c in each tile appropriately collectively carry what is referred to herein as TR-element-function operational circuitry (first circuitry) employed to control and effect the transmission/reception scanning-phase operations of the TR elements for individual activation simultaneously in signal transmission and signal reception modes of behavior. Further details with respect to how such simultaneous activity takes place can be found in various ones of the previously mentioned prior-patent and patent-application informational documents.

Previously mentioned computer 44 (second circuitry) is operatively connected herein to TR element 60. In the operation of the present invention, computer 44 effectively responds to reflected microwave energy which is received by the TR elements, and operates to utilize that information both for detecting and identifying a person-carried, non-physiologic object and/or material.

Figure 11:
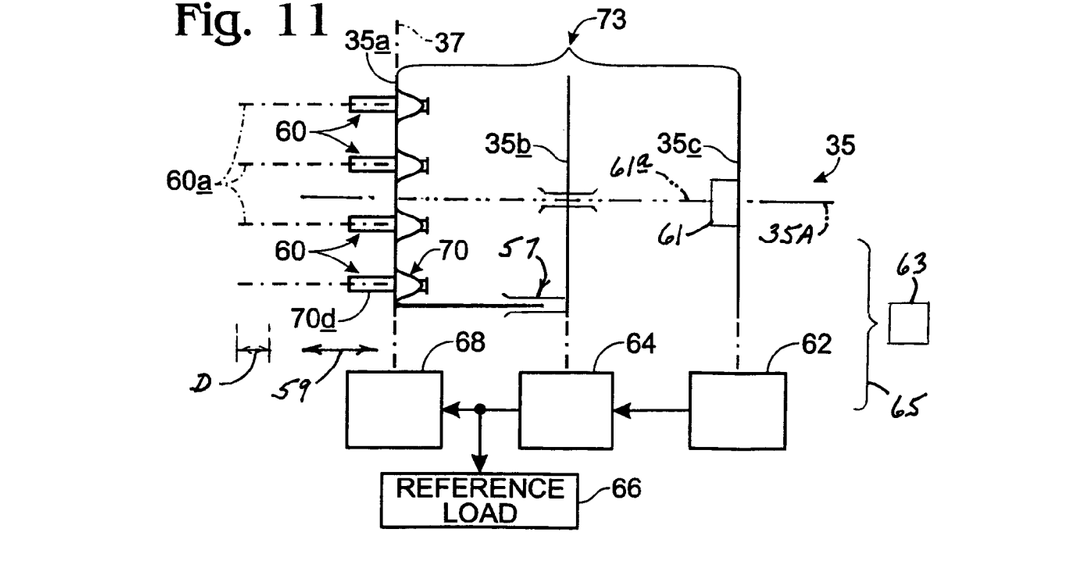
FIG. 11 is a block/schematic view illustrating a single TR element in a single tile structure made in accordance with the invention, and specifically illustrating generally the organization of functional control circuitry and relative-motion-producing motor structure which is employed with the array of TR elements contained in that tile structure. This figure may also be visualized as illustrating a single TR-element implementation of the invention.

Describing now the important relative-motion features offered by the present invention, and directing attention to FIGS. 3, 5, 7, 9, 11, 12A and 12B, circuit board 35a, and thus all of TR elements 60 included in this board, is supported in front of board 35b, through appropriate, conventional, low-friction slide-mount structures 57 (shown only schematically, and at one location only, in FIG. 11). This slide-mount structure accommodates limited linear, reciprocal translation (motion) of board 35a relative to the remainder of tile 35 (namely, boards 35b, 35c). Boards 35b, 35c are suitably locked in position relative to one another.

Figure 7:
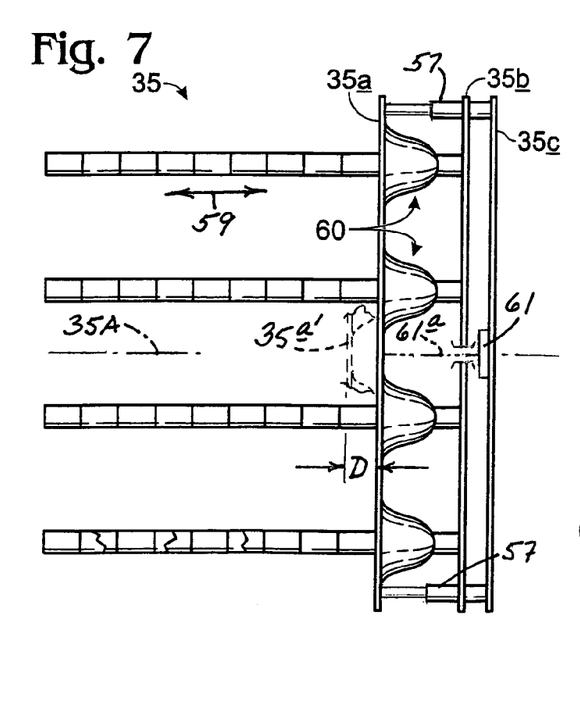
FIG. 7, a view taken generally from the right side of FIG. 6, illustrates moved positions (two positions) for the circuit board in the tile structure of the invention which carries the TR elements.
Figure 8:
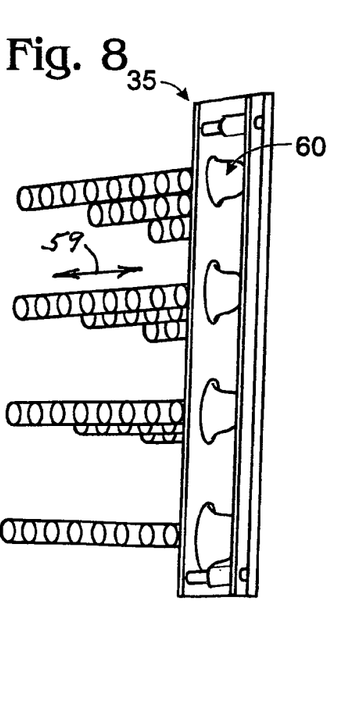
FIG. 8 is similar to FIG. 7, except that it is taken with a slight angle of rear perspective.

This reciprocal motion, which takes place in reversible directions that substantially parallel axes 35A, 60a, is indicated in FIGS. 3, 5, 7–9, inclusive, and 11 by a double-headed arrow 59. The total distance D (see FIGS. 7, 9 and 11) moved in each direction, in accordance with practice of this invention, is no less than, and preferably slightly greater than, one-half the "operating wavelength" (about 2-inches) of TR elements 60. In the system now being described, this distance is about 1.001-inches. In FIG. 7, board 35a is shown in solid lines in its closest position along axis 35A relative to boards 35b, 35c. Fragmentarily, and in dashed lines at 35a' in this same figure, board 35a is shown in its farthest shifted position relative to boards 35b, 35c.

Such reversible motion is produced herein selectively by a precision linear accelerator, or selectively reversible motor structure, 61 (see FIG. 11) which is mounted on board 35c. Accelerator 61 is said herein to be drivingly interposed TR elements 60 and scanning zone 24, and to be drivingly interposed the previously mentioned first and second layer structures for shifting the first layer structure linearly relative to the second layer structure in a manner which substantially parallels previously mentioned axes 60a. Accelerator 61 is drivingly connected to board 35a through a suitable drive connection shown schematically in FIG. 11 at 61a. Drive connection 61a effectively extends from accelerator 61 through board 35b (as is illustrated schematically) to connect with board 35a. In the specific preferred practice of the invention which is now being described, in each scanning phase of operation, accelerator 61 shifts board 35a linearly, in one direction only, either away from or toward the other boards in tile 35, through previously mentioned distance D which, as was mentioned above, is slightly greater than one-half the operating wavelength of TR elements 60.

The relative motion which thus takes place during such a scanning phase (i.e., motion relative to scanning zone 24, and thus relative to any person standing in this zone) is performed, according to preferred practice of the invention, in eleven (N), substantially equal steps (or stages) of about 0.091-inches each. Thus, from one extreme to the other of the full range of motion just described, board 35a lands, so-to-speak, along axes 35A, 60a, and is momentarily stopped, in twelve (N+1) different positions, or stations, in relation to the other boards in tile 35. In FIG. 7, the two moved positions shown for board 35a represent the "opposite-end" extreme positions among these twelve positions. As will be explained shortly, in each of these stations, each TR element, one-after-another, in each tile is operated and enabled simultaneously in transmission and reception modes to direct (i.e., to transmit) microwave energy into zone 24, and receptively to derive, from reflected energy, microwave reflection data from the particular, selected region associated with a person in zone 24 to which the TR element's "attention" (specific radiation) is directed.

"Stepped" operation of motor structure 61 is performed under the control of suitably programmed computer structure, also referred to herein as a position-control, or computer, structure, 63 (see FIG. 11) which is appropriately operatively connected both to motor structure 61 and to the previously mentioned first and second circuitries. These operative connections, which may specifically be conventional in construction, are represented in FIG. 11 by a bracket 65. Computer structure 63 may be "on board", and strictly dedicated to the motor structure 61 in, each tile, or it may be more generalized for control of the motor structures in all of the tiles in system 20. Computer 63 is said herein to activate motor structure 61 in selected coordination with functioning to the earlier-mentioned first circuitry.

Figure 12A:
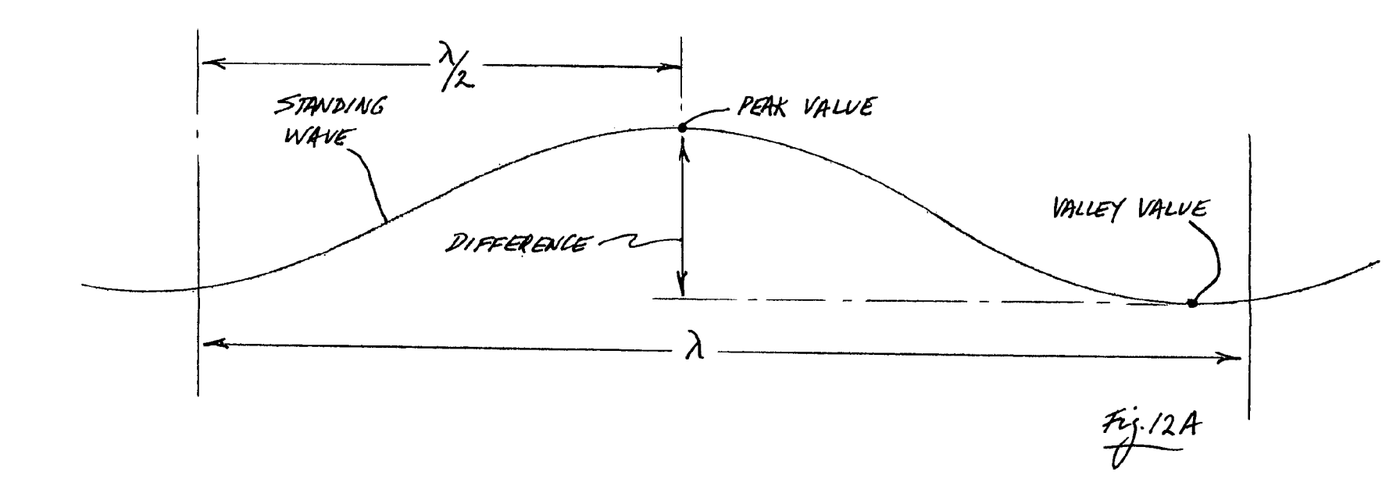
FIGS. 12A and 12B collectively provide stylized graphical illustrations of the special relative-motion features of the present invention which are based upon utilizing reversible motion of each TR element either toward or away from the system scanning zone generally along what is referred to herein as its (the element's) operational axis. These two views are drawn on different scales.
Figure 12B:
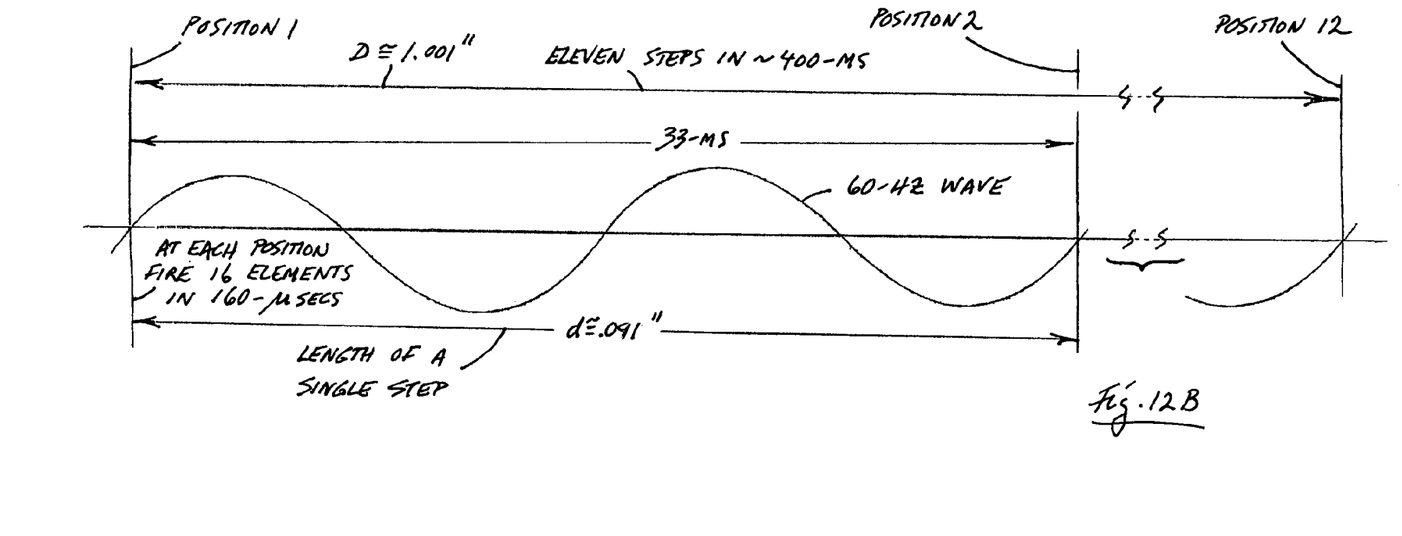

Focusing attention now most especially on FIGS. 12A and 12B, FIG. 12A illustrates, fragmentarily, slightly more than one, full reception standing wave (wavelength=λ, length in space equaling about 2-inches) of microwave radiation which has been directed toward a person in zone 24. This wave has a maximum peak amplitude, so labeled in FIG. 12A, and a maximum valley amplitude (the lowest peak amplitude point in the wave) also so labeled in FIG. 12A. A length of this wave which represents a typical one-half wavelength (λ/2) portion of this wave is appropriately illustrated and labeled in FIG. 12A. One will, of course, note that this λ/2 part of the illustrated standing wave necessarily includes a maximum peak amplitude portion (value) of the wave, as well as a minimum (or maximum valley) amplitude portion (value) of the wave.

It turns out that the value difference (labeled in FIG. 12A) between the maximum and minimum amplitude values in such a standing (reflection) wave associated with a given TR element can give a good indication of the nature or character of the particular region which has produced that reflection wave. This recognition, and the structuring of the present invention to utilize it, are key features of, and contributions to, the art to which this invention relates.

Since each TR element, when it is energized to radiate during a scanning phase, will, when there is reflection from zone 24, generate such a reflection standing wave, all that is necessary to capture this very relevant and important characterization information is to shift the position of that TR element, in the eleven steps mentioned above, a distance which is no less than, and preferably slightly more than, λ/2, and to record the detected, received amplitude values so as to be positioned to calculate the mentioned peak/valley difference.

FIG. 12B, which is also fragmentary in nature, illustrates this distance at D which is noted there to have a dimension of approximately 1.001-inches. FIG. 12A also shows fragmentary portions of a 60-Hz wave, so labeled. This wave, derived directly from conventional 60-Hz AC power which is provided to system 20, is specifically employed herein, as will now be explained, to "key" and synchronize the stepping behavior of each motor structure 61, and the transmission/reception "firings" of the TR elements at each of the twelve stepped positions of these elements during each of the two scanning phases associated with the scanning of a particular person in scanning zone 24. Such "keying" avoids the creation of unwanted data-return artifacts in the scanning/detection operations of system 20. In FIG. 12B, Position-1, Position-2 and Position-12 are specifically marked.

In particular, stepping motion is produced every other, or second, full 60-Hz wave, and this behavior is clearly indicated by labeling which is provided in FIG. 12B. Thus, substantially every 33-ms, a stepping, relative motion action takes place to shift the associated TR elements ultimately from one "extreme" position (Position-1) to the other (Position-12) throughout the full, implemented range of motion, herein about 1.001-inches.

As has already been mentioned, if, at the beginning of the first scanning phase which is associated with a particular person in scanning zone 24, the TR elements in a particular tile reside at their greatest distances from that person, then during the first scanning phase, those elements are advanced toward that person (unidirectional relative motion) in eleven 0.091-inch steps, with appropriate standing wave return amplitude data collected. FIG. 12B shows a single one of such steps at d. At the beginning of the second, completion scanning phase, these same TR elements are moved, in eleven steps, away from the person in zone 24.

Continuing a description now with respect to remaining portions of system 20, generally speaking, the circuitry specifically associated with board 35c, represented by a block 62 in FIG. 11, includes a source of 5.5-Gigahertz signal energy along with appropriate multiplexing circuitry. The circuitry carried by and associated with board portion 35b, represented by a block 64 in FIG. 11, includes high-speed switching circuitry which functions to distribute transmittable signals, one at a time, to the TR elements. The circuitry represented by block 64 also, with respect to each transmission/reception simultaneous operation of each TR element, sends signals to a single reference load which is represented by a block 66 in FIG. 11. High speed switching is accomplished preferably by the use of well known pin diodes, and the reference load contributes significantly to stability of TR-element operation under circumstances with ambient environmental conditions, such as temperature, changing over time. A block 68 in FIG. 11 represents circuitry employed in each board 35a directly to couple transmission and reception signal information to and from the individual TR elements. Details of the circuitry employed herein form no part of the present invention, and thus are neither described nor illustrated in detail. Such circuitry can be constructed in a number of different ways well known to those generally skilled in the relevant art. Reference here may also be made to various ones of the mentioned prior art background documents for suggestions about useful circuitry approaches.

Figure 4:
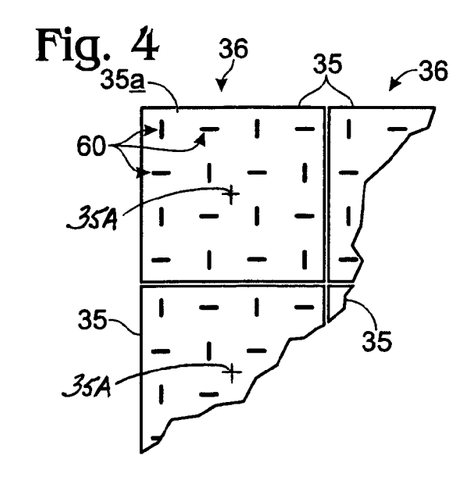
FIG. 4 is a simplified and fragmentary view taken generally along the line 4—4 in FIG. 3 illustrating an arrangement of plural tile structures constructed with TR elements in accordance with the present invention, and disposed in abuttingly and matchingly edge-to-edge and corner-to-corner confrontation. This figure also employs short, side-by-side, alternately orthogonally drawn lines to describe the respective operating directional polarities of adjacent TR elements in tiles.
Figure 5:
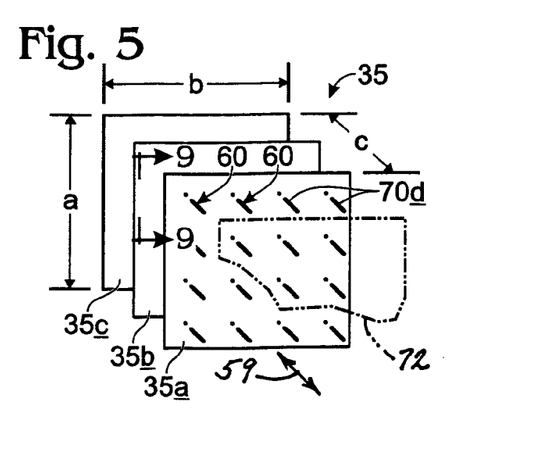
FIG. 5 is a simplified and somewhat stylized, exploded view illustrating the organization of a single tile structure made in accordance with a preferred embodiment of the invention and employed in the arrangement pictured in FIG. 4. Here also, a short, double-headed arrow illustrates TR-element relative motion in accordance with practice of the present invention.
Figure 6:
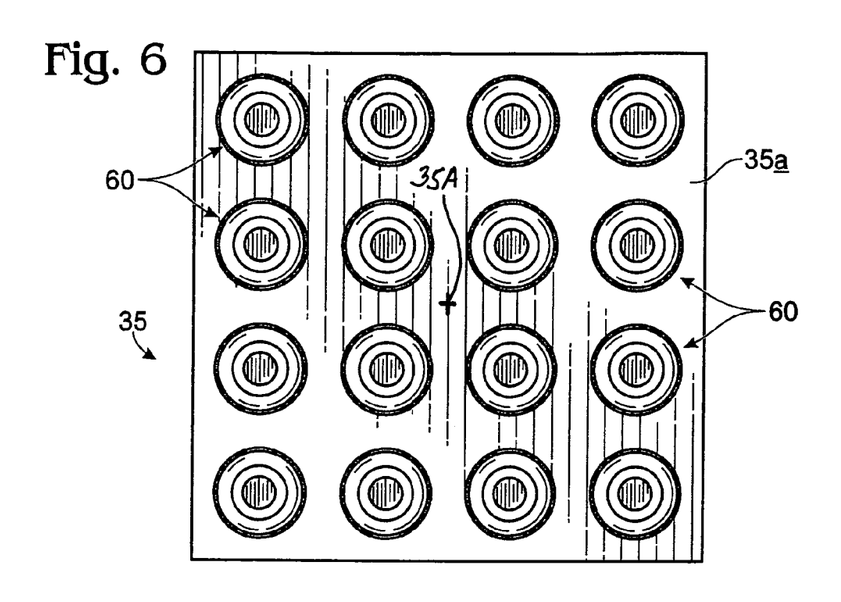
FIG. 6 is a view of what can be thought of as being the TR-element side, or face, of the tile structure pictured in FIG. 5.
Figure 10:
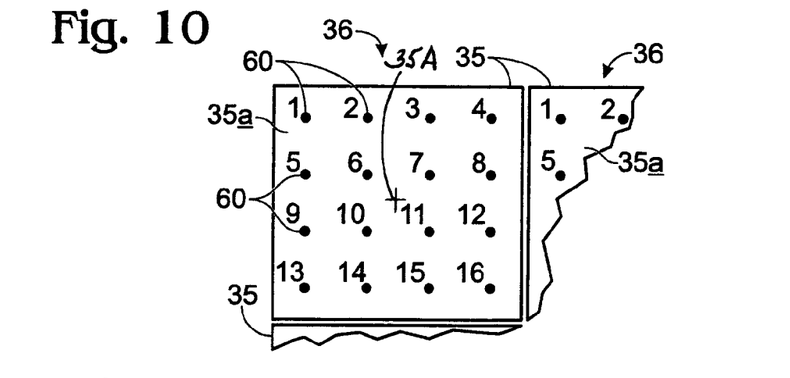
FIG. 10 is a fragmentary view illustrating three side-by-side-arranged tile structures constructed in accordance with the present invention labeled with Arabic numbers to describe a pattern of transmission/reception individuated operation of different ones of the respectively included TR elements.

As can be seen especially well in FIGS. 4, 5, and 10, and also in FIG. 6, and as has been mentioned earlier, included in each tile 35 is a row and column array of sixteen TR elements 60 which are organized along horizontal and vertical row-and-column lines that are orthogonal with respect to one another as viewed, for example, in FIGS. 4, 5, 6 and 10. What can be seen especially well in FIGS. 4 and 10 is the fact that, because of the way in which each tile 35 is constructed, when two tiles are brought into appropriate edge-to-edge abutting relationship, with relevant corners of the tiles essentially meeting with one another, the row-and-column pattern provided in each tile for the TR elements becomes effectively an operational continuum with the row-and-column arrangement of the TR elements in adjacent tiles. This modular consideration is useful in allowing one to assemble plural tiles in good operative adjacency with respect to one another, and in a manner whereby there is a full continuum, across the joints between two tiles, of the distribution pattern provided in each tile for the TR elements.

Each element 60 includes a main body portion 70 which includes a specially shaped portion 70a that is formed by molding integrally with planar portions of circuit board 35a. Also included in each TR element are a front closure plug 70b a circular, electrically driven element 72, a receiving reception conductive element 70c, and a forwardly extending tubular parasitic component 70d which extends outwardly from the front face of circuit board 35a. The specific configurations of TR elements 60 is fully described in above-referred to U.S. Pat. Nos. 4,878,059 and 4,949,094.

Figure 9:
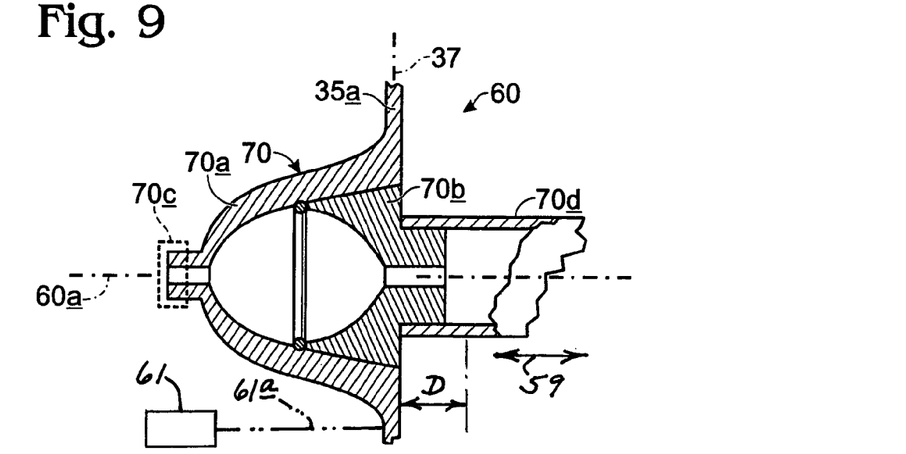
FIG. 9 is an enlarged and fragmentary view taken generally along the line 9—9 in FIG. 5 illustrating common-material integration between different portions of that part of the tile structure of the present invention which contains the array of TR elements. This figure also pictures TR-element, reversible relative motion.

Looking now at FIG. 9 with the point of view that it can be interpreted to illustrate a single, isolated TR element, shown drivingly connected to this element is a linear-accelerator motor structure which bears the same reference numeral 61 as was used with respect to the earlier described motor structure. The driving connection just mentioned immediately above is schematically represented by a dash-double-dot line 61a.

While such single-element structure may be employed if desired in certain applications, where plural TR elements are to be used (as in most instances), integral formation of the main body portions of each TR element with the planar portions of board 35a, as preferably by molding from a polystyrene material, offers the significant advantage that the TR elements can be generated accurately in a precision organized row-and-column fashion.

In a manner which will be well understood by those generally skilled in the relevant art, in each row and column of TR elements, the components of these elements are organized so that next adjacent TR elements are alternately horizontally and vertically polarized. This polarization scheme is clearly represented by the short orthogonally related, straight, dark lines appearing on the faces of three of the four tiles shown generally in FIG. 4.

During a scanning or screening operation employing the TR elements herein, the individual operating energizing pattern takes place in the order of the sixteen Arabic numbers which appear on the face of circuit boards 35a as these are pictured in FIG. 10. In the operation of system 20, when the TR elements in each tile are activated in the order pictured in FIG. 10, the next tile to have its TR elements so activated will be the next below-adjacent tile, if there is such. When all of the TR elements in all of the tiles in a column of tiles 36 have been activated, activation then begins with the uppermost tile in the next adjacent column 36.

On a final note with respect to the description of structure herein, pictured as a, dash-double-dot fragmentary square 72 in FIG. 5, is an appropriate cover structure which shrouds and conceals the presences of TR-element components 70d. This shroud plays no other role with respect to tile structure constructed in accordance with the present invention.

There is thus disclosed a unique microwave TR-element tile structure useful for scanning and screening purposes in a system like system 20. Each tile structure takes the form of a very compact arrangement, and lends itself readily to assembly in an array of plural tiles, such as the arrays which exist in the organizations of columns 36 in system 20. A bracket 73 presented in FIG. 11 represents connection of appropriate circuitry in the tile 35 which is pictured in FIG. 11 with previously mentioned computer 44.

During each scanning phase, of which there are two per person, and in each of the twelve different stepped, relative-motion-achieved proximity spatial positions occupied by the TR elements in each tile, reflection data is gathered and compared with the pre-established dielectric signatures contained in library 46. This comparison, which is looking for scan-detected anomalies in the usual, expected physiological signatures of a person being scanned, functions to "alarm" on detecting any non-physiological anomaly. And importantly, with respect to such a detected anomaly, the associated relative-motion peak/valley amplitude difference is examined to provide a characterization of the nature of the substance and/or object which has produced the anomaly. Larger amplitude differences are typically indicative of, for example, metals, and smaller differences are indicative of, for example, various plastics, such as plastic masking agents used to conceal explosive devices.

Those generally skilled in the art will recognize that, given the description of the invention presented herein, it is a relatively simple matter to pre-calibrate a system, such as system 20, in order to utilize this relative-motion amplitude data with effectiveness.

Thus, proposed by the present invention is a personnel scanning system and related methodology which make unique use of distance relative motion to assess the nature of a forbidden object or substance being carried by a person, while at the same time uniquely detecting the simple fact of the presence of such an object or substance.

Practice of the present invention can be described, from one point of view, as a method employable in a defined scanning phase for scanning a person to detect the possible presence and character of a forbidden non-physiologic object/material, with this method including the steps of (a) transmitting and directing microwave radiation of a defined wavelength λ toward a selected region of that person, (b) on the basis of such transmitting and directing, receiving from the person's selected region such microwave radiation which is reflected from that region, (c) during such transmitting, directing and receiving in a scanning phase, detecting a value difference between the peak and valley amplitude values of such reflected radiation in the reflection, and (d) interpreting this value difference at least to give an indication of the character of the object/material present at the mentioned person-region which has produced the received reflection.

Accordingly, while a preferred embodiment, and manner of practicing, the invention have been described and illustrated herein, variations and modifications will certainly come to the minds of those skilled generally in the relevant art, and it is intended that the claims herein will cover all such variations and modifications.

I claim:

1. Personnel scanning apparatus for detecting and assisting in identifying certain categories of non-physiologic objects/materials being carried by a person comprising
a defined personnel scanning zone,
a microwave transmission/reception (TR) element having
   a transmission/reception operational axis, supported adjacent said zone with its axis aimed into the zone, and for selective reciprocal motion relative to the zone along its said axis,
first circuitry operatively connected to said TR element, functional to effect operation of the element in a scanning phase simultaneously in transmission and reception modes of operation, whereby the element transmits microwave energy into, and is enabled to receive any such energy reflected from, said zone, and
selectively reversible motor structure operatively and drivingly interposed said zone and said TR element, activatable selectively and reversibly during a scanning phase to shift said element in one of two selected, generally linear, reverse directions along the element's axis so as to shift the element selectively toward or away from said zone.

2. Personnel scanning apparatus for detecting and assisting in identifying certain categories of non-physiologic objects/materials being carried by a person comprising
- a defined personnel scanning zone,
- a microwave transmission/reception (TR) element having a transmission/reception operational axis, supported adjacent said zone with its axis aimed into the zone, and for selective reciprocal motion relative to the zone along its said axis,
- first circuitry operatively connected to said TR element, functional to effect operation of the element in a scanning phase simultaneously in transmission and reception modes of operation, whereby the element transmits microwave energy into, and is enabled to receive any such energy reflected from, said zone,
- selectively reversible motor structure operatively and drivingly interposed said zone and said TR element, activatable selectively and reversibly to shift said element in selected, generally linear, reverse directions along the element's axis so as to shift the element selectively toward and away from the zone,
- position control structure operatively connected both to said first circuitry and to said motor structure, operable, during operation of said element in a scanning phase, to activate said motor structure in selected coordination with functioning of said first circuitry so as to shift, and cause motion of, the element in one only of the mentioned, reverse, generally linear, toward and away directions, and
- second circuitry operatively connected to said TR element for responding to reflected energy received by the element, and operable to utilize such detected, reflected energy as information for detecting and identifying a person-carried, non-physiologic object/material in any one of the mentioned, certain categories of such materials.

3. The apparatus of claim 2, wherein said TR element is disposed with respect to said scanning zone for recurrent, reversible, revolutional motion relative to that zone in a manner which causes the element's axis to transition back and forth between two, orthogonally related orientations relative to, and aimed into, the zone.

4. The apparatus of claim 2, wherein said first circuitry effects operation of said TR element at a defined microwave wavelength $\lambda$, and said position control and motor structures are designed to create motion of said element during a scanning phase relative to said zone throughout a distance which is defined percentage of $\lambda$.

5. The apparatus of claim 4, wherein the defined percentage is no less than $\lambda/2$.

6. The apparatus of claim 5, wherein each scanning phase is divided into a plurality of N defined stages, said position control and motor structures create motion of said TR element in N defined steps, and each step corresponds to a scanning-phase stage, and results in element motion along a distance which at least equals $\lambda/2N$.

7. The apparatus of claim 6, wherein, during the entirety of a scanning operation, said TR element occupies, successively, N+1 different positions along its operational axis relative to said scanning zone.

8. The apparatus of claim 2, wherein said first circuitry, during an entire scanning phase, operates said TR element at a defined operating frequency having a defined wavelength $\lambda$, and said position control and motor structures effectively create motion of the element along a distance in one direction relative to said zone which is greater than $\lambda/2$.

9. The apparatus of claim 8, wherein each scanning phase is divided into a plurality of N defined stages, said position control and motor structures create motion of said TR element in N defined steps, and each step corresponds to a scanning-phase stage, and results in element motion along a distance which is greater than $\lambda/2N$.

10. The apparatus of claim 8, wherein, during the entirety of a scanning operation, said TR element occupies, successively, N+1 different positions along its operational axis relative to said scanning zone.

11. Integrated microwave transmission/reception tile structure comprising
- a first, generally planar, circuit-board layer structure including an array of plural, integrally formed microwave transmission/reception (TR) elements arranged in a defined row-and-column pattern, each of said TR elements possessing an associated TR axis extending generally normal to the plane of said first layer structure,
- a second, generally planar, circuit-board layer structure including TR-element-function operational circuitry operatively connected to said TR elements, and functional to promote operation of the TR elements simultaneously in transmission and reception modes of operation,
- selectively reversible motor structure operatively and drivingly interposed said first and second layer structures, activatable reversibly to shift said first layer structure relative to said second layer structure generally in a linear manner substantially paralleling said TR elements' said axes, and
- position control structure operatively connected both to said operational circuitry and to said motor structure, operable to activate said motor structure in selected coordination with functioning of said operational circuitry.

12. The tile structure of claim 11 wherein said first and second circuit-board layer structures collectively take the form of an assembled stack of plural circuit board portions.

13. The tile structure of claim 11, wherein said first circuit-board layer structure includes a circuit board, and portions said circuit board and portions of said plural TR elements are integrally molded of a common material.

14. A microwave method employable in a defined scanning phase for scanning a person to detect the possible presence and character of a forbidden non-physiologic object/material comprising
- transmitting and directing microwave radiation of a defined wavelength $\lambda$ toward a selected region of that person,
- on the basis of said transmitting and directing, receiving from the selected region associated with that same person such microwave radiation which is reflected (a reflection) from that region of the person,
- during said transmitting, directing and receiving in a scanning phase, detecting a value difference between the peak and valley amplitude values of such reflected radiation in the reflection, and
- interpreting this value difference at least to give an indication of the character of the object/material present at the mentioned region which has produced the received reflection.

15. The method of claim 14, wherein said transmitting, directing and receiving are performed by a transmission/ reception (TR) element, and said detecting is performed during a scanning phase in cooperation with shifting of this element unidirectionally, relative to the person then being scanned, by a distance which is at least λ/2.

16. Personnel scanning apparatus for detecting and assisting in identifying certain categories of non-physiologic objects/materials being carried by a person comprising a tile including a tile axis, and a stack of plural, spaced circuit boards distributed along said axis, an array of transmission/reception (TR) scanning elements included with one of said circuit boards in said stack, and structure supporting said one circuit board for selective reversible motion along said axis relative to the other circuit boards in said stack.

* * * * *

UNITED STATES PATENT AND TRADEMARK OFFICE
CERTIFICATE OF CORRECTION

PATENT NO. : 7,187,281 B2  
APPLICATION NO. : 11/069841  
DATED : March 6, 2007  
INVENTOR(S) : Tex Yukl It is certified that error appears in the above-identified patent and that said Letters Patent is hereby corrected as shown below:

On Title Page item 12, change "Yuki" to --Yukl--

On the Title Page, item 75, change "Tex Yuki" to --Tex Yukl--

Signed and Sealed this

Eighth Day of May, 2007

JON W. DUDAS  
*Director of the United States Patent and Trademark Office*